(12) United States Patent
Juarez Espinoza et al.

(10) Patent No.: US 12,409,784 B2
(45) Date of Patent: Sep. 9, 2025

(54) VEHICLE HAVING LOAD FLOOR HOLDER

(71) Applicant: Ford Global Technologies, LLC, Dearborn, MI (US)

(72) Inventors: Jose Nicolas Juarez Espinoza, Cuajimalpa de Morelos (MX); Diego Fabricio Villacres Mesias, Cuajimalpa (MX); Raul Rafael Martinez Huesca, Atizapan de Zaragoza (MX); Mariana Moctezuma Zamudio, Huixquilucan de Degollado (MX); Jose Luis Toriz Vega, Metepec (MX)

(73) Assignee: Ford Global Technologies, LLC, Dearborn, MI (US)

( * ) Notice: Subject to any disclaimer, the term of this patent is extended or adjusted under 35 U.S.C. 154(b) by 386 days.

(21) Appl. No.: 18/131,494

(22) Filed: Apr. 6, 2023

(65) Prior Publication Data

US 2024/0336203 A1 Oct. 10, 2024

(51) Int. Cl.
*B60R 5/04* (2006.01)

(52) U.S. Cl.
CPC ...................................... *B60R 5/04* (2013.01)

(58) Field of Classification Search
CPC ................................ B60R 5/044; B60R 5/045
USPC ...................................................... 296/37.14
See application file for complete search history.

(56) References Cited

U.S. PATENT DOCUMENTS

| 5,685,592 | A | 11/1997 | Heinz |
| 6,955,511 | B1 | 10/2005 | Preta |
| 7,503,610 | B2 | 3/2009 | Karagitz et al. |
| 7,661,742 | B2 * | 2/2010 | Medlar ............. B60R 5/04 296/37.16 |
| 9,315,156 | B1 | 4/2016 | Nedelman |
| 10,196,008 | B2 | 2/2019 | Ranka et al. |
| 2002/0096900 | A1 | 7/2002 | Moore |
| 2004/0129852 | A1 | 7/2004 | Giampavolo |
| 2010/0078956 | A1 * | 4/2010 | Aebker ............. B60R 5/04 296/37.13 |
| 2016/0096479 | A1 | 4/2016 | Nedelman |

(Continued)

FOREIGN PATENT DOCUMENTS

| DE | 10261393 A1 | 7/2004 | |
| DE | 102011010458 A1 * | 10/2011 | ............. B60R 5/044 |
| DE | 102016222982 A1 * | 1/2018 | ........... B60R 13/013 |

(Continued)

*Primary Examiner* — Robert E Fuller
(74) *Attorney, Agent, or Firm* — Vichit Chea; Price Heneveld LLP

(57) ABSTRACT

A vehicle cargo storage system configured to be located in a floor of a vehicle, the vehicle cargo storage system includes a compartment configured to extend into and below the floor of the vehicle, and a cover movable between a closed position covering the compartment and providing a load floor and an upright open position to expose the compartment. The system also includes a retractable load floor holder comprising a protrusion coupled with an interior of the vehicle, the load floor holder having at least one bias arm and a side first surface and a rear second surface, wherein when the cargo floor cover is configured to move with force from the closed position to the upright open position to allow the cargo floor cover to slide along the side first surface of the protrusion and depress the protrusion, and is supported in the upright open position by the rear second surface.

16 Claims, 6 Drawing Sheets

(56) References Cited

U.S. PATENT DOCUMENTS

2020/0122643 A1    4/2020  Loew et al.

FOREIGN PATENT DOCUMENTS

| | | | | |
|---|---|---|---|---|
| DE | 102017006581 A1 | * | 1/2019 | ............... B60R 5/04 |
| DE | 102021106973 B3 | * | 8/2022 | ........... B60R 13/011 |
| EP | 1258396 A2 | | 9/1998 | |
| EP | 2095997 A1 | * | 9/2009 | ............ B60R 5/045 |
| EP | 2522550 A1 | * | 11/2012 | ............ B60R 5/044 |
| EP | 4488121 A1 | * | 1/2025 | ........... B60R 13/013 |
| ES | 2934873 A1 | * | 2/2023 | ............... B60R 5/04 |
| ES | 2941253 B2 | * | 10/2023 | ........... B60R 13/013 |
| ES | 2982591 A1 | * | 10/2024 | ............ B60R 5/044 |
| FR | 2611619 A1 | * | 9/1988 | ............ B60R 5/045 |
| KR | 200431629 Y1 | * | 11/2006 | ............ B60R 5/044 |
| KR | 20070049896 A | * | 5/2007 | ............ B60R 5/045 |
| KR | 101610582 B1 | * | 4/2016 | ............ B60J 5/108 |
| KR | 20180046185 A | * | 5/2018 | ............ B60J 5/108 |
| KR | 20240061144 A | * | 5/2024 | ............ B60R 5/044 |
| WO | 2006020974 A2 | | 2/2006 | |

\* cited by examiner

VEHICLE HAVING LOAD FLOOR HOLDER

FIELD OF THE DISCLOSURE

The present disclosure generally relates to vehicle storage systems, and more particularly relates to a retractable load floor holder for a vehicle cargo storage system.

BACKGROUND OF THE DISCLOSURE

Motor vehicles are commonly equipped with storage compartments for storing cargo. For example, the rear cargo area of a vehicle may include a hidden storage compartment that extends in a recessed area below the cargo floor and has a removable load floor cover. Quite often, a spare tire or other items may be stored within the rear cargo area storage compartment. It would be desirable to provide for a cargo storage system that allows efficient access to the storage compartment.

SUMMARY OF THE DISCLOSURE

According to a first aspect of the present disclosure, a vehicle cargo storage system configured to be located in a floor of a vehicle is provided. The vehicle cargo storage system includes a compartment configured to extend into and below the floor of the vehicle, and a cover movable between a closed position covering the compartment and providing a load floor and an upright open position to expose the compartment. The system also includes a retractable load floor holder comprising a protrusion coupled with an interior of the vehicle, the load floor holder having at least one bias arm and a side first surface and a rear second surface, wherein when the cargo floor cover is configured to move with force from the closed position to the upright open position to allow the cargo floor cover to slide along the side first surface of the protrusion and depress the protrusion to a retracted position, and is supported in the upright open position by the rear second surface with the protrusion in an extended position.

Embodiments of the first aspect of the present disclosure can include any one or a combination of the following features:
- the at least one bias arm provides a bias force without a separate spring;
- the load floor holder is connected to an interior trim panel of the vehicle, wherein the protrusion extends through an opening in the trim panel;
- the compartment is located in a rear end of the vehicle;
- the at least one bias arm comprises a pair of first bias arms;
- the load floor holder comprises a pair of first arms configured to pivot about a pivot point as the protrusion moves between the extended position and the retracted position;
- the protrusion further comprises a cylindrical rod for engaging a hook in the interior of the vehicle;
- a second plurality of parallel arms parallel to the pair of first arms;
- the holder comprises a flange for engaging the interior;
- the protrusion comprises a unitary protrusion; and
- the retractable load floor holder comprises first and second load floor holders.

According to a second aspect of the present disclosure, a retractable load floor holder for use in a vehicle cargo storage system that is configured to be located in a floor of a vehicle is provided. The load floor holder includes a unitary protrusion coupled with an interior panel of the vehicle, the protrusion having a side first surface and a second rear surface, and at least one bias arm extending from the protrusion. The system also includes a supporting base configured to engage the interior panel in the vehicle, wherein the first side surface of the protrusion is configured to be engaged by a cargo floor cover and depressed to a retracted position by the cargo floor cover as the cargo floor cover is rotated towards an upright position and a rear surface is configured to hold the cargo floor cover in the upright position with the protrusion in an extended position.

Embodiments of the second aspect of the present disclosure can include any one or a combination of the following features:
- the at least one bias arms provide a bias force without a separate spring;
- the load floor holder is connected to an interior trim panel of the vehicle;
- the compartment is located in a rear end of the vehicle;
- the at least one bias arm comprises a pair of first bias arms;
- the load floor holder comprises a pair of first arms are configured to pivot about a pivot point as the protrusion moves between the first position and second position;
- the protrusion further comprises a cylindrical rod for engaging a hook in the panel of the vehicle;
- a second plurality of parallel arms parallel to the pair of first arms; and
- the holder comprises a flange for engaging the interior.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
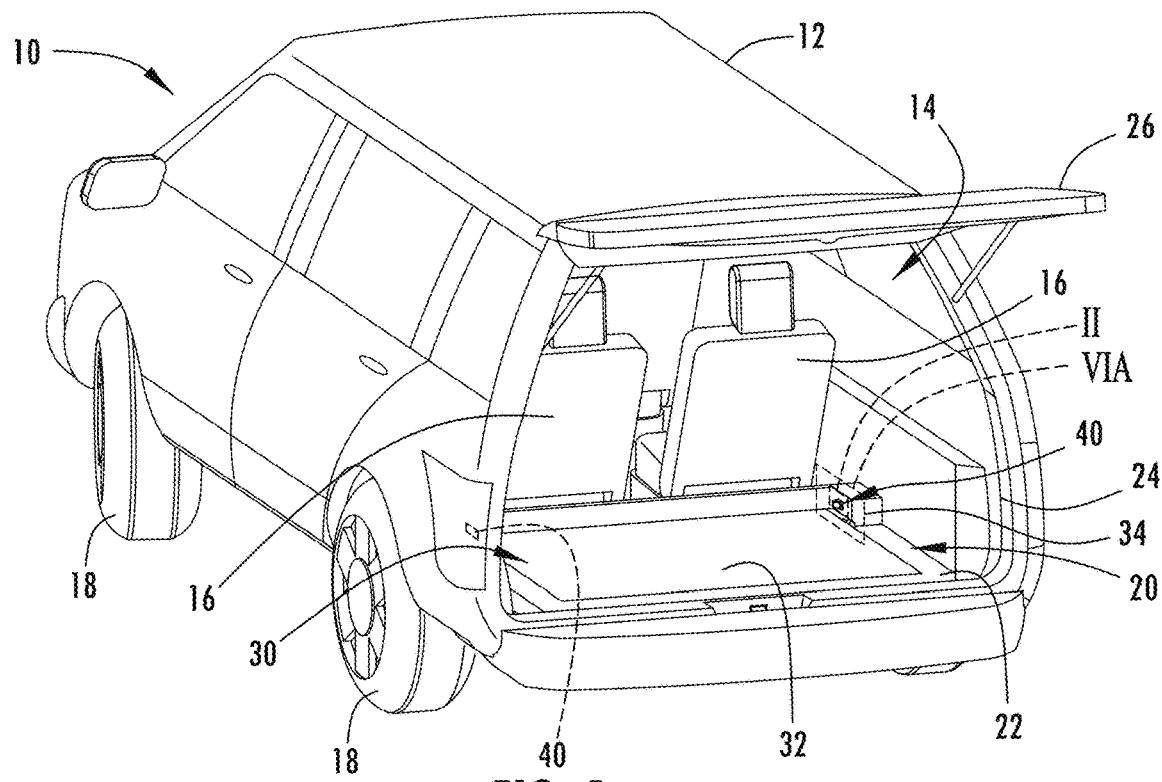
FIG. 1 is a rear perspective view of a motor vehicle having a cargo storage system shown having a load floor cover in a stowed position in a rear cargo area, according to a first embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle cargo storage system and load floor holder. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1A:
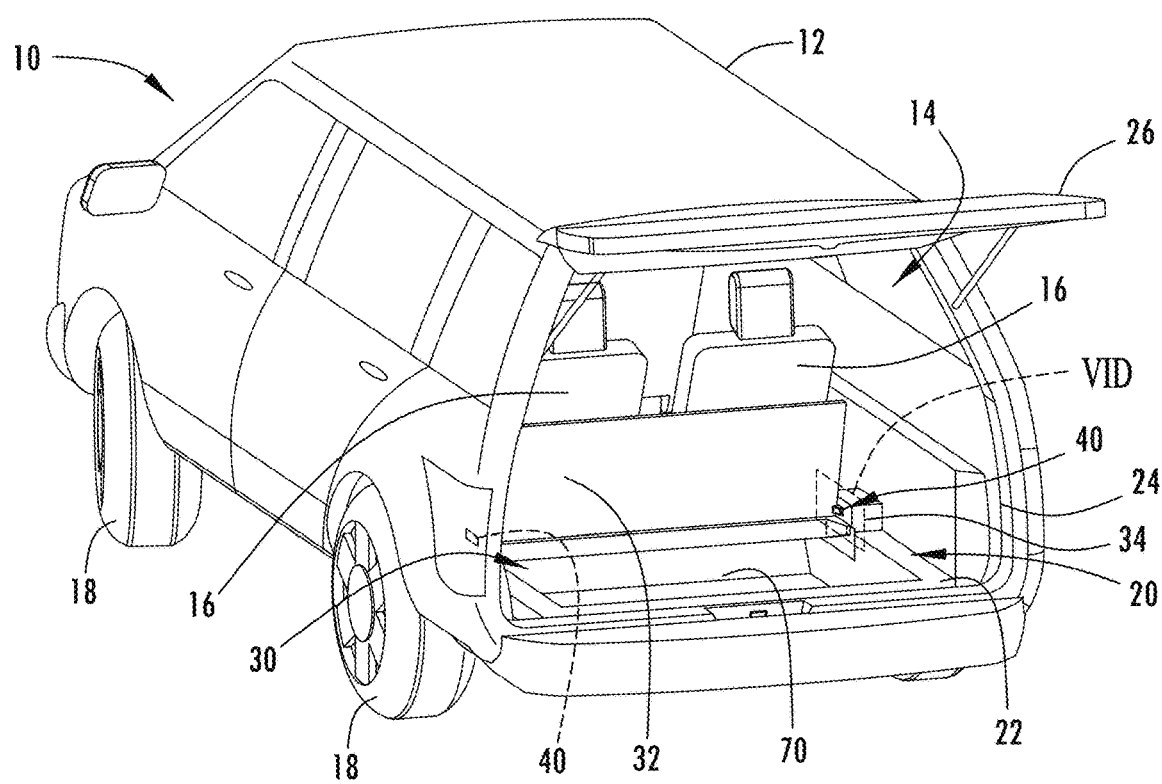
FIG. 1A is a rear perspective view of the motor vehicle having the cargo storage system shown supported on a retractable load floor holder in an open load floor cover position.

Referring to FIGS. 1 and 1A, a wheeled automotive or motor vehicle 10 is generally illustrated configured with passenger seating for transporting one or more passengers, such as a driver of the vehicle and additional passengers, and for further transporting one or more items as cargo onboard the motor vehicle 10. The motor vehicle 10 has a vehicle body 12 that generally defines a cabin interior 14. The cabin interior 14 may contain various features and trim components. The cabin interior 14 is shown having an arrangement of passenger seats 16 which may include a front row of passenger seats and one or more rear rows of passenger seats, each configured to seat a passenger. The motor vehicle 10 shown herein, in one example, is a sport utility vehicle (SUV), however, it should be appreciated that the motor vehicle 10 may otherwise be configured as a van, a sedan, a truck or other motor vehicle having a cargo area configurable to include a cargo storage system.

The motor vehicle 10 is shown as a wheeled motor vehicle having a plurality of wheel assemblies 18 on a chassis which generally supports the body 12. At the rear end of the motor vehicle 10 is a rear door liftgate 26 which is generally configured to pivot about upper hinges between an open door position shown in FIG. 1 which exposes the cabin interior 14 via a rear opening 24 and a closed door position which closes the rear opening 24. Located proximate to the rear of the motor vehicle 10 forward of the liftgate 26 and rearward of the passenger seats 16 is a rear cargo area 20 which has a cargo floor 22. The cargo floor 22 may include a load floor cover 32 positionable over a compartment 70. One or more items of cargo may be located in the compartment 70 and on top of the load floor cover 32 in rear cargo area 20.

The motor vehicle 10 includes a cargo storage system 30 located in the rear cargo area 20. The storage cargo system 30 has a load floor lid or cover 32 that is movable to convert between a closed position shown in FIG. 1 and an open position shown in FIG. 1A. In the open position, the load floor cover 32 is rotated upward to an upright and a somewhat substantially vertical position rearward of the seats 16 and exposes the compartment 70 that is configured extending into and below a floor 22 of the vehicle to form a cargo storage compartment. As such, the load floor cover 32 in the closed position covers the storage compartment 70 and provides a generally horizontal load floor that extends substantially flush with the cargo floor 22 to support cargo placed on top thereof.

The vehicle cargo storage system 30 includes a retractable load floor holder 40 located on each of the opposite lateral sides of the cargo area 20. As such, a first retractable load floor holder 40 is located on one lateral side of the cargo area 20 and a second retractable load floor holder 40 is located on an opposite lateral side of the cargo area 20. Each of the retractable load floor holders 40 are located within trim panels 34 of the vehicle 10 defining interior walls proximate to the cargo area 20.

Each retractable load floor holder 40 includes a unitary protrusion coupled with an interior wall of the vehicle, which is shown as the trim panel 34. Each retractable load floor holder 40 in an extended position extends laterally inwards from the trim panel 34 towards the cabin interior. The retractable load floor holder 40 is biased to the extended position towards the cabin interior 14 and has a first angled surface that extends laterally inward to allow the load floor cover 32 to be rotated upward and to engage the first angled surface of the retractable load floor holder 40 which forcibly depresses or retracts the retractable load floor holder 40 to a retracted position and allow the load floor cover 32 to forcibly pass by until the load floor cover 32 extends upright beyond the retractable load floor holder 40. In this upright position, the load floor cover 32 may be retained in the upright position leaning against a rear surface of the retractable load floor holders 40 as seen in FIG. 1A. As such, the load floor cover 32 may be rotated upwards and held in the upright position on opposite lateral sides by the pair of load floor holders 40. To move the load floor cover 32 back to the horizontal closed position, the load floor cover 32 may be raised by a user and repositioned on top of the chamber 70 or a user may depress the retractable load floor holders 40 to allow the load floor cover 32 to rotate back down to the horizontal closed position.

Figure 2:
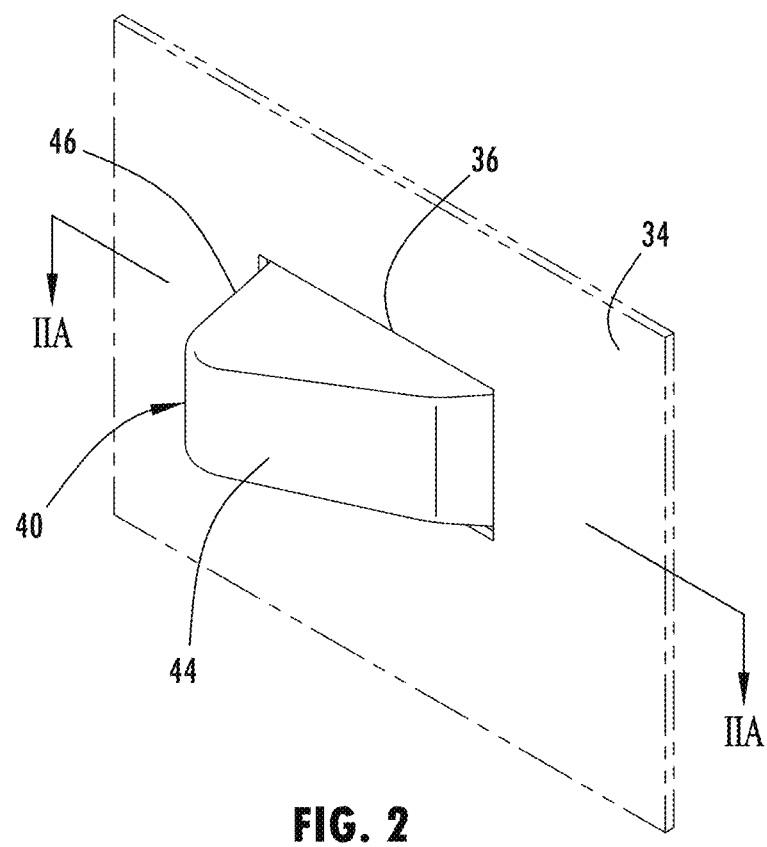
FIG. 2 is an enlarged view of section II of FIG. 1A illustrating the load floor holder in an extended position.
Figure 3:
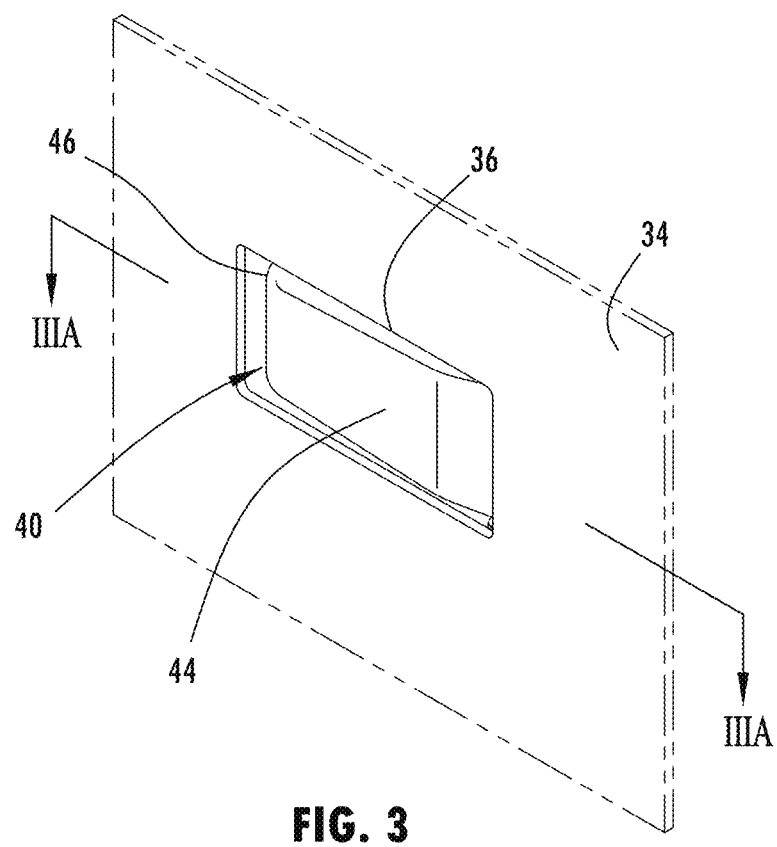
FIG. 3 is an enlarged perspective view of the load floor holder in a retracted position.
Figure 3A:
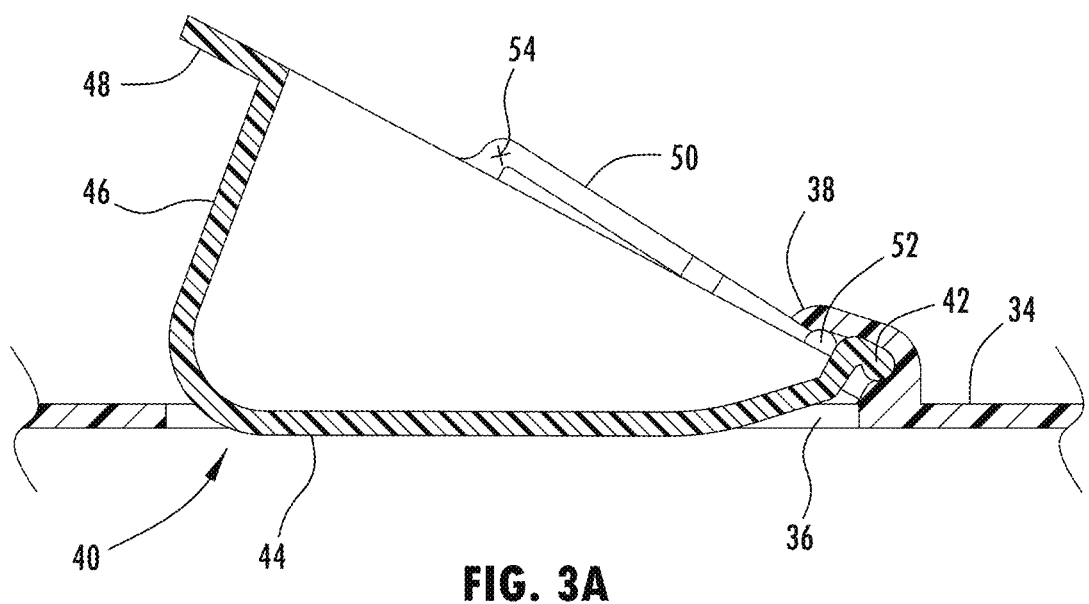
FIG. 3A is a cross-sectional view taken through line IIIA-IIIA of FIG. 3.

Referring to FIGS. 2-3A, one of the retractable load floor holders 40 is illustrated located within a trim panel 34 of the cabin interior 14 of the vehicle 10. The retractable load floor holder 40 includes the unitary protrusion having a first contact surface 44 configured extending inward towards the cabin interior at an angle α that is configured to be engaged by the load floor cover 32 as the load floor cover 32 moves from the horizontal closed position to the upright open position. The angle α may be in a range between about 5° and 85°, or more particularly between about 25° and 75°, for example, such that the surface acts as a cam surface. The retractable load floor holder 40 has a second rear contact surface 46 configured at an angle β and configured to hold or retain the load floor cover 32 in the upright open position.

Angle β may be in the range of about 75° to 105°, for example. The unitary protrusion has a rod 42 that provides a head at a first end which is shown located within a hook 38 provided in the trim panel 34. As such, the rod 42 may pivot within the hook 38 as the retractable load floor holder 40 is moved between extended and retracted positions. At an end opposite of the rod 42 is a flange 48 which is configured to engage a rear surface of the trim panel 34 to provide an end of travel limit to the extended position of the retractable load floor holder 40 as seen in FIG. 2A.

Figure 2A:
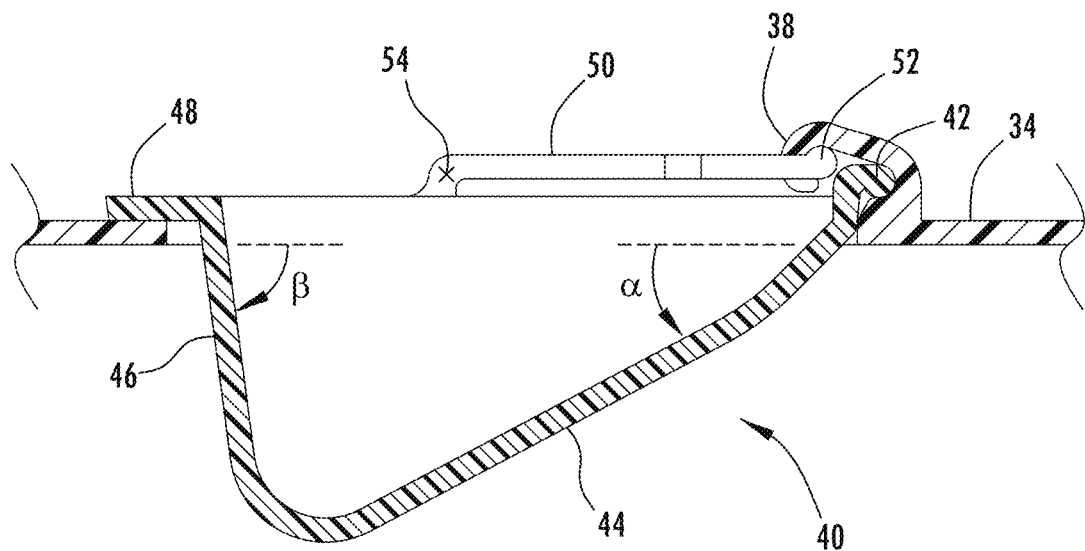
FIG. 2A is a cross-sectional view taken through line IIA-IIA of FIG. 2.

The retractable load floor holder 40 is shown in the extended position in FIGS. 2 and 2A extending radially inward into the cabin interior from the trim panel 34. The load floor holder 40 has a pair of first bias arms 50, each of which includes a rod 52 at one end engaged within the hook 38 of the trim panel 34 and has a pivot point 54 at the opposite end. The first bias arms 50 provide a bias force to force the retractable load floor holder 40 towards the extended position so that flange 48 engages the rear surface of the trim panel 34 as shown in FIG. 2A. It should be appreciated that the unitary protrusion of the load floor holder 40 may be made of a polymeric material, such as plastic, which is flexible and has memory sufficient to apply a bias force when the bias arms 50 are bent and hence loaded.

When the retractable load floor cover 32 is lifted at the rear end of the vehicle and rotated upward and passes along in contact with the first contact surface 44, the retractable load floor holder 40 is forced laterally outward from the extended position shown in FIGS. 2 and 2A towards the retracted position shown in FIGS. 3 and 3A. In the retracted position, the load floor cover 32 is able to pass fully vehicle forward of the retractable load floor holder 40. When this occurs, the bias force from the first bias arms 50 causes the retractable load floor holder 40 to extend back to the extended position to block the load floor cover 32 from rotating downward and to hold the load floor cover 32 in the upright open position resting on the second contact surface 46.

Figure 4:
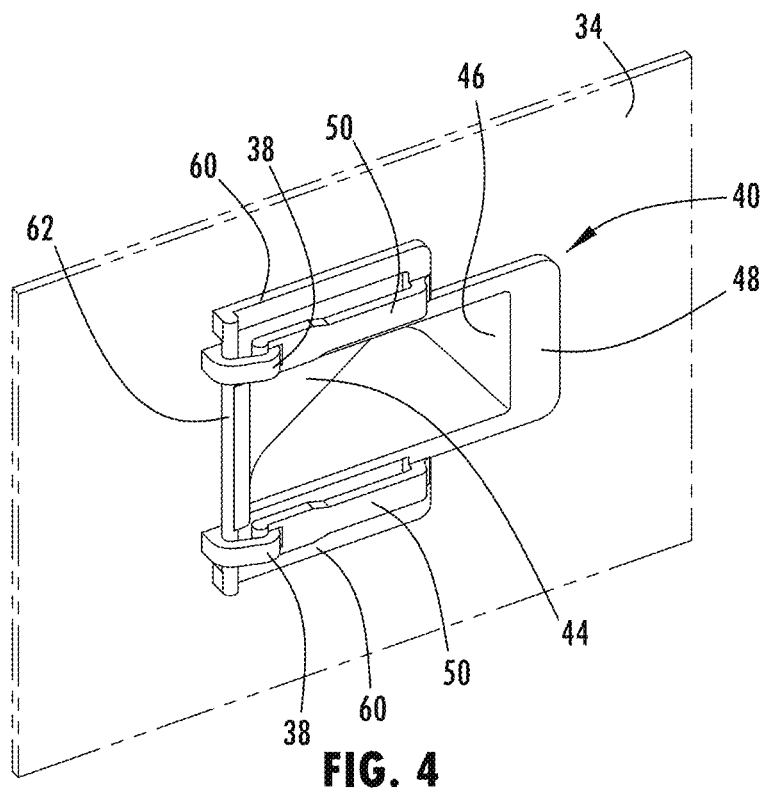
FIG. 4 is a perspective view of the load floor holder in the first extended position.
Figure 5:
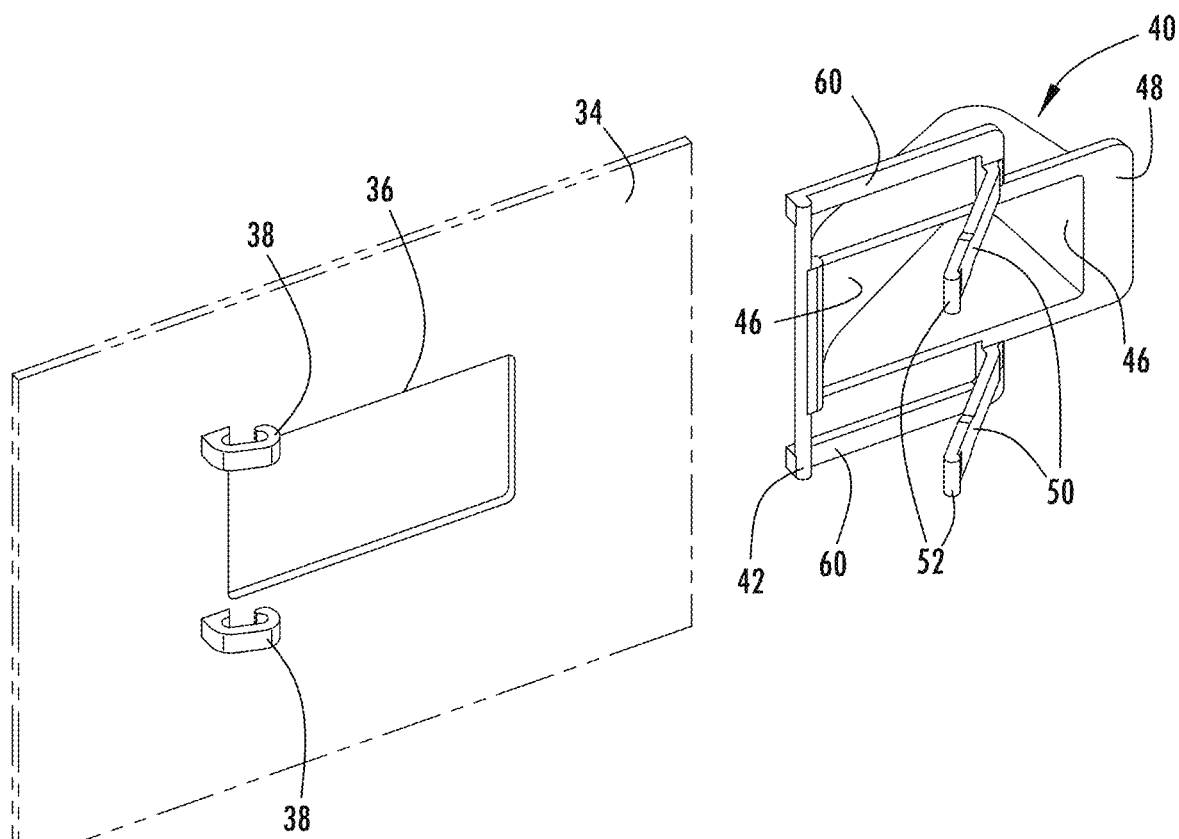
FIG. 5 is an exploded of the load floor holder and trim panel.

Referring to FIGS. 4 and 5, the retractable load floor holder 40 is further illustrated having the unitary body configured to fit within a generally rectangular opening 36 within trim panel 34. The retractable load floor holder 40 is shown having the first bias arms 50 engaged at first rods 52 within hooks 38 which are integrally formed within the trim panel 34. The retractable load floor holder 40 further includes a pair of second arms 60 which are attached to rods 42 and rods 42 are interconnected through a rod 62. Rod 62 is connected at the same time to angled surface 44 at its extreme. Each of the second arms 60 engages the inner wall of the trim panel 34 surrounding opening 36 and allows the first bias arms 50 to pivot or rotate relative thereto to provide the loaded bias force.

Figure 6A:
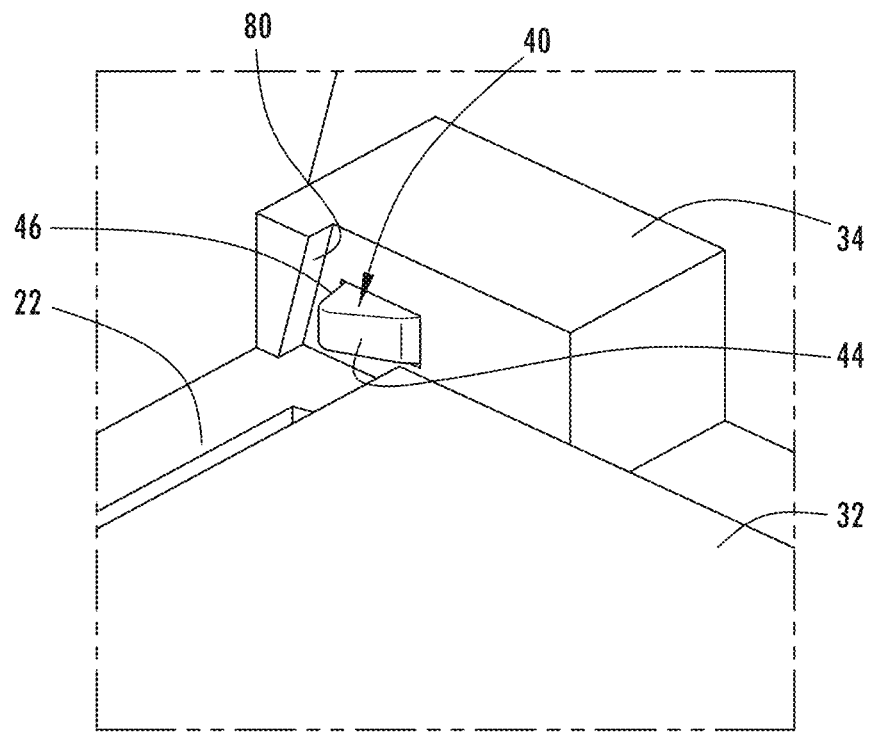
FIG. 6A is an enlarged view of a portion of the load floor cover in a first cover position relative to the extended load floor holder.
Figure 6B:
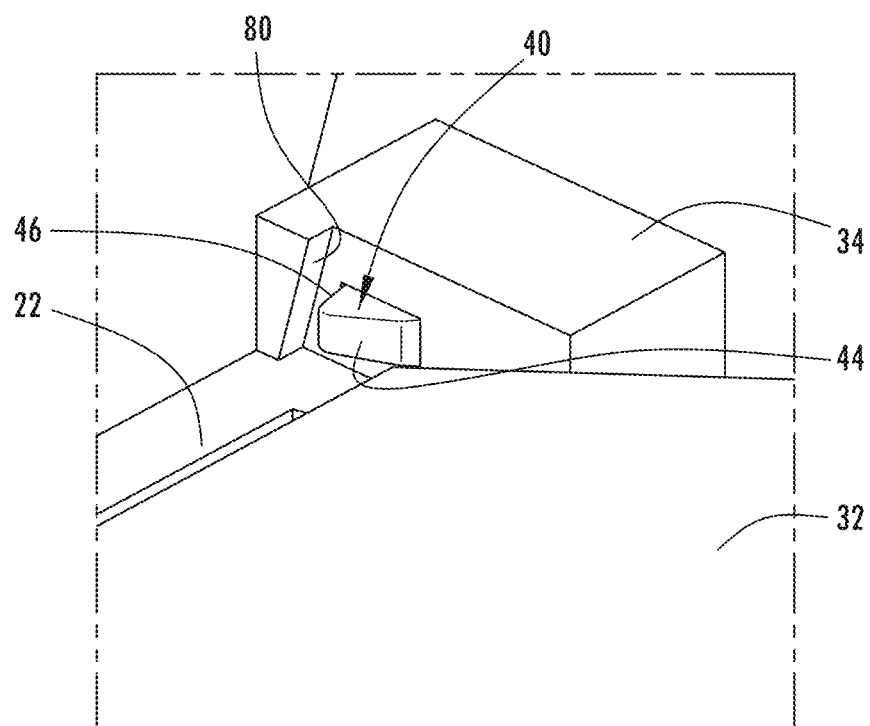
FIG. 6B is an enlarged view of the load floor cover at a rotated angle relative to the extended load floor holder.
Figure 6C:
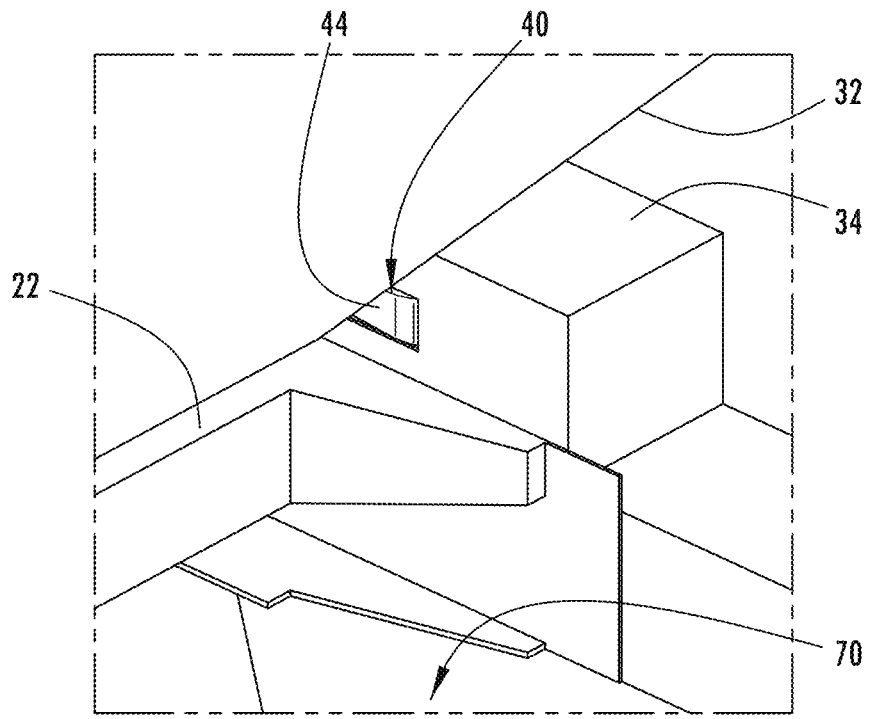
FIG. 6C is an enlarged view of the load floor cover engaging and forcing the load floor holder to the retracted position.
Figure 6D:
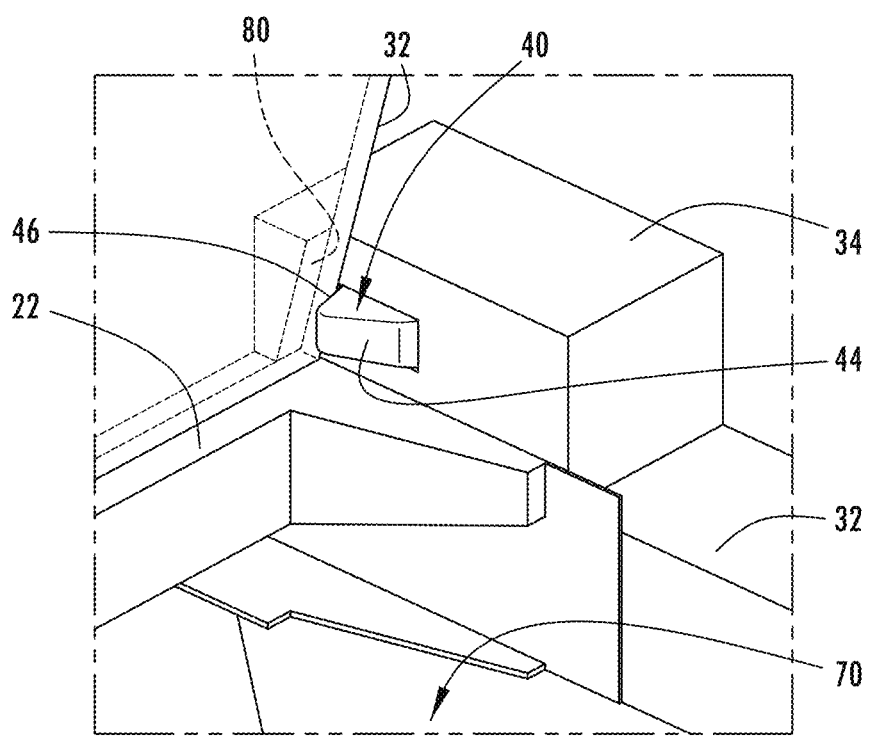
FIG. 6D is an enlarged view of the load floor cover supported on the load floor holder in an open cover position.

Referring to FIGS. 6A-6D, movement of the load floor cover 32 from the closed position to the extended open position is shown. As seen in FIG. 6A, the load floor cover 32 may rest upon the floor 22 to cover the storage compartment 70. To access the storage compartment 70, a user may lift the rear end of the load floor cover 32 upward such that the load floor cover 32 rotates up and comes into initial engagement with the first contact surface 44 of the load floor holder 40 as seen in FIG. 6B. As the load floor cover 32 continues to be rotated further upward as seen in FIG. 6C, the load floor cover 32 engages and depresses the load floor holder 40 such that the load floor holder 40 moves to the retracted position as the load floor cover 32 passes by the angled first contact surface 44. Once the load floor cover 32 passes completely past the load floor holder 40, the load floor holder 40 is bias forced to extend back outwards into the extended position as seen in FIG. 6D in which the load floor cover 32 may rest upon and be supported by the rear second contact surface 46. In this position, the load floor cover 32 may further be supported on a vehicle forward side by a support wall 80, which is shown provided in the trim panel 34. It should be appreciated that the support wall 80 may further be provided by another structure, such as the rear surface of the seat 16, according to other examples. In the open position, the load floor lid 32 allows for access to the storage compartment 70. To cover the storage compartment 70, a user may lift the load floor cover 32 and reposition it on top of floor over the storage compartment 70 or may depress the load floor holders 40 to allow the load floor cover 32 to rotate back down to the horizontal closed cover position.

Accordingly, the vehicle cargo storage system 30 and retractable load floor holder advantageously provide for a load floor holder 40 on a vehicle 10 that is easy to install and requires few components and does not require extra springs. The vehicle cargo storage system 30 and retractable load floor holder 40 may be employed at various locations on the vehicle 10 to provide for a cargo storage system.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle cargo storage system configured to be located in a floor of a vehicle, the vehicle cargo storage system comprising:
   a compartment configured to extend into and below the floor of the vehicle;
   a cover movable between a closed position covering the compartment and providing a load floor and an upright open position to expose the compartment; and
   a retractable load floor holder comprising a protrusion coupled with an interior of the vehicle, the load floor holder having at least one bias arm and a side first surface and a rear second surface, wherein when the cargo floor cover is configured to move with force from the closed position to the upright open position to allow the cargo floor cover to slide along the side first surface of the protrusion and depress the protrusion to a retracted position, and is supported in the upright open position by the rear second surface with the protrusion in an extended position, and wherein the at least one bias arm comprises a pair of first bias arms each configured to pivot about a pivot point as the protrusion moves between the extended position and the retracted position.

2. The vehicle cargo storage system of claim 1, wherein the at least one bias arm provides a bias force without a separate spring.

3. The vehicle cargo storage system of claim 1, wherein the load floor holder is connected to an interior trim panel of the vehicle, wherein the protrusion extends through an opening in the trim panel.

4. The vehicle cargo storage system of claim 3, wherein the compartment is located in a rear end of the vehicle.

5. The vehicle cargo storage system of claim 1, wherein the protrusion further comprises a cylindrical rod for engaging a hook in the interior of the vehicle.

6. The vehicle cargo storage system of claim 5, wherein the retractable load floor holder further comprises a second plurality of parallel arms parallel to the pair of first bias arms in the retracted position.

7. The vehicle cargo storage system of claim 1, wherein the holder comprises a flange for engaging the interior.

8. The vehicle cargo storage system of claim 1, wherein the protrusion comprises a unitary protrusion.

9. The vehicle cargo storage system of claim 1, wherein the retractable load floor holder comprises first and second load floor holders.

10. A retractable load floor holder for use in a vehicle cargo storage system that is configured to be located in a floor of a vehicle, the load floor holder comprising:
    a unitary protrusion coupled with an interior panel of the vehicle, the protrusion having a side first surface and a second rear surface;
    at least one bias arm extending from the protrusion; and
    a supporting base configured to engage the interior panel in the vehicle, wherein the first side surface of the protrusion is configured to be engaged by a cargo floor cover and depressed to a retracted position by the cargo floor cover as the cargo floor cover is rotated towards an upright position and a rear surface is configured to hold the cargo floor cover in the upright position with the protrusion in an extended position, and wherein the at least one bias arm comprises a pair of first bias arms each configured to pivot about a pivot point as the protrusion moves between the extended position and the retracted position.

11. The retractable load floor holder of claim 10, wherein the at least one bias arms provide a bias force without a separate spring.

12. The retractable load floor holder of claim 10, wherein the load floor holder is connected to an interior trim panel of the vehicle.

13. The retractable load floor holder of claim 12, wherein the compartment is located in a rear end of the vehicle.

14. The retractable load floor holder of claim 10, wherein the protrusion further comprises a cylindrical rod for engaging a hook in the panel of the vehicle.

15. The retractable load floor holder of claim 14, wherein the retractable load floor holder further comprises a second plurality of parallel arms parallel to the pair of first bias arms in the retracted position.

16. The retractable load floor holder of claim 10, wherein the holder comprises a flange for engaging the interior.

* * * * *